United States Patent
Yamashiro et al.

(10) Patent No.: US 10,428,203 B2
(45) Date of Patent: Oct. 1, 2019

(54) PNEUMATIC TIRE

(71) Applicant: SUMITOMO RUBBER INDUSTRIES, LTD., Kobe-shi, Hyogo (JP)

(72) Inventors: Yuhei Yamashiro, Kobe (JP); Kazuya Torita, Kobe (JP); Soh Ishino, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/503,236

(22) PCT Filed: Jul. 10, 2015

(86) PCT No.: PCT/JP2015/069832
§ 371 (c)(1),
(2) Date: Feb. 10, 2017

(87) PCT Pub. No.: WO2016/039007
PCT Pub. Date: Mar. 17, 2016

(65) Prior Publication Data
US 2017/0226325 A1   Aug. 10, 2017

(30) Foreign Application Priority Data

Sep. 8, 2014   (JP) ................ 2014-182386

(51) Int. Cl.
| | | |
|---|---|---|
| C08K 5/548 | (2006.01) | |
| C08K 3/36 | (2006.01) | |
| C08L 15/00 | (2006.01) | |
| C08K 3/04 | (2006.01) | |
| B60C 1/00 | (2006.01) | |
| B60C 11/00 | (2006.01) | |

(52) U.S. Cl.
CPC ............ C08K 5/548 (2013.01); B60C 1/0016 (2013.01); B60C 1/0025 (2013.01); B60C 1/0041 (2013.01); B60C 11/005 (2013.01); C08K 3/04 (2013.01); C08K 3/36 (2013.01); C08L 15/00 (2013.01); B60C 2001/005 (2013.01); B60C 2001/0066 (2013.01)

(58) Field of Classification Search
CPC .. C08K 5/548; C08K 3/04; C08K 3/36; C08L 15/00; B60C 1/0016; B60C 1/0025; B60C 11/005; B60C 1/0041; B60C 2001/005; B60C 2001/0066
See application file for complete search history.

(56) References Cited

U.S. PATENT DOCUMENTS

| | | |
|---|---|---|
| 4,124,051 A | 11/1978 | Horton |
| 4,945,964 A | 8/1990 | Takiguchi et al. |
| 5,385,459 A | 1/1995 | Graves et al. |
| 5,627,237 A * | 5/1997 | Halasa .................. B60C 1/0016 152/905 |
| 5,804,644 A | 9/1998 | Nakafutami et al. |
| 9,127,145 B2 | 9/2015 | Tanabe |
| 2004/0242797 A1 | 12/2004 | Stere et al. |
| 2004/0254301 A1 | 12/2004 | Tsukimawashi et al. |
| 2005/0119414 A1 | 6/2005 | Sasagawa et al. |
| 2006/0167160 A1 | 7/2006 | Nakagawa et al. |
| 2007/0078202 A1* | 4/2007 | Mihara ..................... C08K 9/06 523/212 |
| 2011/0136962 A1* | 6/2011 | Hattori .................. B60C 1/0016 524/493 |
| 2011/0144236 A1 | 6/2011 | Mihara |
| 2011/0166254 A1 | 7/2011 | Nishimura |
| 2011/0184084 A1 | 7/2011 | Katou |
| 2012/0283354 A1 | 11/2012 | Hattori et al. |
| 2012/0325391 A1 | 12/2012 | Miyazaki |
| 2013/0079464 A1* | 3/2013 | Nishioka ............... B60C 1/0016 524/572 |
| 2014/0090764 A1 | 4/2014 | Miyazaki |
| 2014/0329930 A1 | 11/2014 | Sato |

(Continued)

FOREIGN PATENT DOCUMENTS

| | | |
|---|---|---|
| CN | 1156467 A | 8/1997 |
| CN | 1541245 A | 10/2004 |

(Continued)

OTHER PUBLICATIONS

Machine translation of JP-2000-344955-A, dated Dec. 12, 2000.
Machine translation of JP-2003-277560-A, dated Oct. 2, 2003.
Machine translation of JP-2008-184517-A, dated Aug. 14, 2008.
Machine translation of JP-2013-224391-A, dated Oct. 31, 2013.
Machine translation of JP-2013-82778-A, dated May 9, 2013.
Machine translation of JP-2014-133827-A, dated Jul. 24, 2014.
Machine translation of JP-2014-133828-A, dated Jul. 24, 2014.
Machine translation of JP-2014-80451-A, dated May 8, 2014.
International Search Report (Form PCT/ISA/210) for International Application No. PCT/JP2015/069823, dated Oct. 13, 2015.
International Search Report (Form PCT/ISA/210) for International Application No. PCT/JP2015/069836, dated Oct. 13, 2015.
Written Opinion of the International Searching Authority (Form PCT/ISA/237) for International Application No. PCT/JP2015/069823, dated Oct. 13, 2015.

(Continued)

Primary Examiner — Alexander C Kollias
(74) Attorney, Agent, or Firm — Birch, Stewart, Kolasch & Birch, LLP

(57) ABSTRACT

The present invention provides a pneumatic tire with well improved fuel economy, rubber tensile strength, and abrasion resistance. The present invention relates to a pneumatic tire formed from a rubber composition, the rubber composition containing: a hydrogenated copolymer obtained by copolymerization of an aromatic vinyl compound and a conjugated diene compound, the hydrogenated copolymer having a degree of hydrogenation of the conjugated diene units of 75 mol % or more; silica; and a silane coupling agent 1 containing a carbonylthio group (—S—C(=O)—) but no mercapto group (—SH) and/or a silane coupling agent 2 containing a mercapto group (—SH), the rubber composition containing, per 100% by mass of a rubber component, 75% by mass or more of the hydrogenated copolymer.

10 Claims, No Drawings

(56) References Cited

U.S. PATENT DOCUMENTS

| | | |
|---|---|---|
| 2014/0371372 A1 | 12/2014 | Hirayama |
| 2015/0031839 A1 | 1/2015 | Washizu |
| 2015/0361210 A1* | 12/2015 | Nosaka .................. C08C 19/02 524/575 |
| 2015/0368387 A1 | 12/2015 | Nosaka et al. |
| 2016/0339743 A1* | 11/2016 | Abad ...................... C08L 53/02 |
| 2017/0066910 A1 | 3/2017 | Miura |
| 2017/0226233 A1 | 8/2017 | Yamashiro et al. |
| 2017/0226331 A1 | 8/2017 | Ishino et al. |
| 2017/0233562 A1 | 8/2017 | Yamada et al. |
| 2017/0240731 A1 | 8/2017 | Yamashiro et al. |
| 2018/0142089 A1 | 5/2018 | Yamashiro |

FOREIGN PATENT DOCUMENTS

| | | |
|---|---|---|
| CN | 1576279 A | 2/2005 |
| CN | 101412515 A | 4/2009 |
| CN | 101990558 A | 3/2011 |
| CN | 102093602 A | 6/2011 |
| CN | 106519351 A | 3/2017 |
| EP | 0775725 A1 | 5/1997 |
| EP | 1258498 A1 | 11/2002 |
| EP | 2236554 A1 | 10/2010 |
| EP | 2757131 A1 | 7/2014 |
| EP | 2960286 A1 | 12/2015 |
| EP | 2963087 A1 | 1/2016 |
| EP | 3064545 A1 | 9/2016 |
| EP | 3162846 A1 | 5/2017 |
| EP | 3208108 A1 | 8/2017 |
| JP | 2-147647 A | 6/1990 |
| JP | 6-9822 A | 1/1994 |
| JP | 7-76635 A | 3/1995 |
| JP | 8-59898 A | 3/1996 |
| JP | 10-182884 A | 7/1998 |
| JP | 2000-119445 A | 4/2000 |
| JP | 2000-344955 A | 12/2000 |
| JP | 2001-81243 A | 3/2001 |
| JP | 2002-12704 A | 1/2002 |
| JP | 2002-212340 A | 7/2002 |
| JP | 2003-41059 A | 2/2003 |
| JP | 2003-277560 A | 10/2003 |
| JP | 2006-213807 A | 8/2006 |
| JP | 2006-249188 A | 9/2006 |
| JP | 2007-137941 A | 6/2007 |
| JP | 4060105 B2 | 3/2008 |
| JP | 2008-174696 A | 7/2008 |
| JP | 2008-184517 A | 8/2008 |
| JP | 2008-248203 A | 10/2008 |
| JP | 2010-242019 A | 10/2010 |
| JP | 2011-1435 A | 1/2011 |
| JP | 2011-144239 A | 7/2011 |
| JP | 2011-153293 A | 8/2011 |
| JP | 2011-236368 A | 11/2011 |
| JP | 2012-52028 A | 3/2012 |
| JP | 2012-153810 A | 8/2012 |
| JP | 2012-188537 A | 10/2012 |
| JP | 2013-18868 A | 1/2013 |
| JP | 2013-28783 A | 2/2013 |
| JP | 2013-35902 A | 2/2013 |
| JP | 2013-082778 A | 5/2013 |
| JP | 2013-224391 A | 10/2013 |
| JP | 2013-253207 A | 12/2013 |
| JP | 2014-24913 A | 2/2014 |
| JP | 2014-080451 A | 5/2014 |
| JP | 2014-125546 A | 7/2014 |
| JP | 2014-133827 A | 7/2014 |
| JP | 2014-133828 A | 7/2014 |
| JP | 2015-54875 A | 3/2015 |
| JP | 2015-110703 A | 6/2015 |
| JP | 2017-52874 A | 3/2017 |
| WO | WO 2009/060931 A1 | 5/2009 |
| WO | WO 2013/099324 A1 | 7/2013 |
| WO | 2013/125614 A1 | 8/2013 |
| WO | WO 2014/126184 A1 | 8/2014 |
| WO | 2014/133097 A1 | 9/2014 |
| WO | 2015/064646 A1 | 5/2015 |

OTHER PUBLICATIONS

Written Opinion of the International Searching Authority (Form PCT/ISA/237) for International Application No. PCT/JP2015/069836, dated Oct. 13, 2015.

Author Unknown, "Carbon Black Production and Application Manual," Sep. 30, 2000, 8 pages total.

English translation of the Chinese Office Action for Application No. 201580044936.7, dated Mar. 30, 2018.

English translation of the Chinese Office Action for Application No. 201580044378.4, dated Aug. 16, 2018.

Zhao et al., "Effect of Coupling Agent on Properties of Silica Z1115MP Filled SSBR/BR Compound," Journal of Qingdao University of Science and Technology(Natural Science Edition), vol. 34, No. 4, Aug. 2013, pp. 387-392, with an English abstract.

Database WPI Week 200661, "Rubber composition for pneumatic tire, is formed by mixing specific hydrogenated styrene-butadiene copolymer and aromatic vinyl compound conjugated diene compound copolymer, each having preset weight average molecular weight," Thomson Scientific, London, GB, AN 2906-589923, Aug. 17, 2006, 2 pages, XP002770767.

Sanshin Chemical Industry, "Sanceler TBZTD," retrieved from URL:http:www.sanshin-ci.co.jp/eng/index/syouhin/1/sanceler_tbztd.htm, retrieved Dec. 17, 2018, 1 page.

"Polymer Chemistry and Physics," Light Industry Press, Feb. 28, 1981, p. 351 (2 pages total).

English translation of the Chinese Office Action for Application No. 201580044936.7, dated Nov. 16, 2018.

Yanming et al., "Polymer Structure and Properties," East China University of Science and Technology Press, Jan. 31, 2010, p. 278-279 (3 pages total).

ASTM, "Standard Test Method for Carbon Black-CTAB (Cetyltrimethylammonium Bromide) Surface Area (Withdrawn 2007)," ASTM D3765-04, 2004, XP-002778471, 3 pages.

ASTM, "Standard Test Methods for Carbon Black-Surface Area by Multipoint B.E.T. Nitrogen Adsorption (Withdrawn 2000)," ASTM D4820-99, 1999, XP-002778482, 2 pages.

ASTM, "Standard Test Methods for Carbon Black-Surface Area by Nitrogen Adsorption (Withdrawn 1999)," ASTM D3037-93, 1993, XP-002778481, 2 pages.

Chinese Office Action and Search Report for Chinese Application No. 201580045221.3, dated Mar. 30, 2018, with an English translation of the Office Action.

\* cited by examiner

PNEUMATIC TIRE

TECHNICAL FIELD

The present invention relates to a pneumatic tire formed from a specific rubber composition.

BACKGROUND ART

With the recent increase in concern about environmental issues, the demand on automobiles for better fuel economy has been increasing. Higher fuel economy is also required of rubber compositions for automotive tires. For example, rubber compositions containing conjugated diene polymers such as polybutadiene or a butadiene-styrene copolymer and filler such as carbon black or silica are used in automotive tires.

Patent Literature 1, for example, proposes a method for improving fuel economy by using a diene rubber (modified rubber) that has been modified with an organosilicon compound containing an amino group and an alkoxy group. Although fuel economy is improved by such conventional techniques, another important challenge from economic and safety standpoints is to ensure sufficient abrasion resistance and sufficient tensile properties (rubber tensile strength). Regarding this issue, the conventional techniques unfortunately do not sufficiently provide abrasion resistance, which is in a trade-off relationship with fuel economy, and can also cause rubber chipping. It is still difficult to improve fuel economy while simultaneously improving rubber tensile strength and abrasion resistance.

CITATION LIST

Patent Literature

Patent Literature 1: JP 2000-344955 A

SUMMARY OF INVENTION

Technical Problem

The present invention aims to solve the above problem and provide a pneumatic tire with well improved fuel economy, rubber tensile strength, and abrasion resistance.

Solution to Problem

The present invention relates to a pneumatic tire, formed from a rubber composition, the rubber composition containing:
a hydrogenated copolymer obtained by copolymerization of an aromatic vinyl compound and a conjugated diene compound, the hydrogenated copolymer having a degree of hydrogenation of the conjugated diene units of 75 mol % or more; silica; and at least one of a silane coupling agent 1 containing a carbonylthio group (—S—C(=O)—) but no mercapto group (—SH) or a silane coupling agent 2 containing a mercapto group (—SH), the rubber composition containing, per 100% by mass of a rubber component, 75% by mass or more of the hydrogenated copolymer.

The hydrogenated copolymer preferably has a weight average molecular weight of 200,000 to 2,000,000.

The hydrogenated copolymer preferably has a degree of hydrogenation of 90 mol % or more.

The hydrogenated copolymer is preferably a hydrogenated styrene-butadiene copolymer.

The hydrogenated styrene-butadiene copolymer is preferably a hydrogenated modified styrene-butadiene copolymer.

The hydrogenated styrene-butadiene copolymer preferably has a styrene content of 5% to 40% by mass.

The hydrogenated styrene-butadiene copolymer is preferably present in an amount of 90% to 100% by mass per 100% by mass of the rubber component.

Preferably, the rubber composition further contains carbon black, and the silica and the carbon black are present in amounts of 1 to 200 parts by mass and 1 part by mass or more, respectively, relative to 100 parts by mass of the rubber component.

Preferably, the silane coupling agent 1 and the silane coupling agent 2 are present in a combined amount of 1 to 10 parts by mass relative to 100 parts by mass of the silica.

Preferably, the silane coupling agent 1 is represented by the following Formula (2-1):

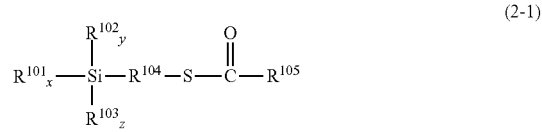

wherein $R^{101}$ represents a monovalent group selected from —Cl, —Br, —$OR^{106}$, —O(O=)$CR^{106}$, —ON=$CR^{106}R^{107}$, —ON=$CR^{106}R^{107}$, —$NR^{106}R^{107}$ or —(OSi$R^{106}R^{107}$)$_h$(OSi$R^{106}R^{107}R^{108}$), where $R^{106}$, $R^{107}$, and $R^{108}$ may be the same or different, and each represent a hydrogen atom or a C1-C18 monovalent hydrocarbon group, and h has a value, on average, of 1 to 4; $R^{102}$ represents $R^{101}$, a hydrogen atom, or a C1-C18 monovalent hydrocarbon group; $R^{103}$ represents $R^{101}$, $R^{102}$, a hydrogen atom, or the group: —[O($R^{109}$O)$_j$]$_{0.5}$—, where $R^{109}$ represents a C1-C18 alkylene group, and j represents an integer of 1 to 4; $R^{104}$ represents a C1-C18 divalent hydrocarbon group; $R^{105}$ represents a C1-C18 monovalent hydrocarbon group; and x, y, and z are numbers satisfying the following relations: x+y+2z=3, 0≤x≤3, 0≤y≤2, and 0≤z≤1.

Preferably, the silane coupling agent 2 contains a linking unit A represented by Formula (2-2) below and a linking unit B represented by Formula (2-3) below:

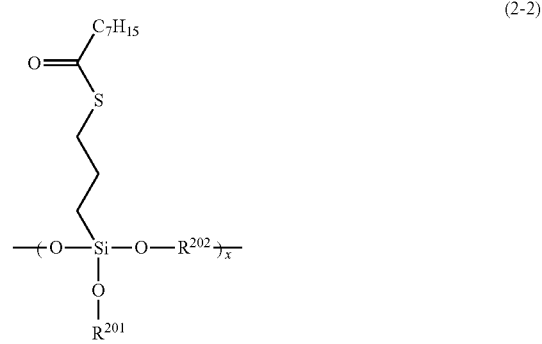

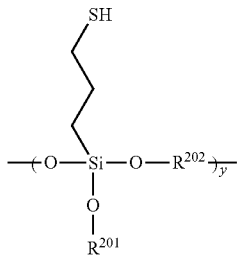

(2-3)

wherein x represents an integer of 0 or more; y represents an integer of 1 or more; $R^{201}$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxy group or a carboxyl group; $R^{202}$ represents a branched or unbranched C1-C30 alkylene group, a branched or unbranched C2-C30 alkenylene group, or a branched or unbranched C2-C30 alkynylene group; and $R^{201}$ and $R^{202}$ may together form a cyclic structure.

Advantageous Effects of Invention

The pneumatic tire of the present invention is formed from a rubber composition which contains a specific hydrogenated copolymer having a degree of hydrogenation of 75 mol % or more in an amount of 75% by mass or more per 100% by mass of the rubber component, and further contains silica and a silane coupling agent having a specific structure. Such a pneumatic tire exhibits good fuel economy, good rubber tensile strength, and good abrasion resistance.

DESCRIPTION OF EMBODIMENTS

The pneumatic tire of the present invention is formed from a rubber composition. The rubber composition contains, per 100% by mass of the rubber component, 75% by mass or more of a hydrogenated copolymer obtained by copolymerizing an aromatic vinyl compound and a conjugated diene compound to produce a copolymer (hereinafter, also referred to as a copolymer of an aromatic vinyl compound and a conjugated diene compound), and hydrogenating the conjugated diene units of the copolymer to give a degree of hydrogenation of 75 mol % or more. The rubber composition further contains silica, and a silane coupling agent 1 containing a carbonylthio group (—S—C(=O)—) but no mercapto group (—SH) and/or a silane coupling agent 2 containing a mercapto group (—SH).

The rubber composition in the present invention contains, per 100% by mass of the rubber component, 75% by mass or more of a hydrogenated copolymer obtained by hydrogenating the conjugated diene units of a copolymer of an aromatic vinyl compound and a conjugated diene compound to give a degree of hydrogenation of 75 mol % or more. This improves rubber tensile strength and abrasion resistance well. The rubber composition in the present invention further contains silica, and a silane coupling agent 1 containing a carbonylthio group (—S—C(=O)—) but no mercapto group (—SH) and/or a silane coupling agent 2 containing a mercapto group (—SH). By incorporating a combination of the hydrogenated copolymer and the silane coupling agent(s) into a silica-containing rubber compound, fuel economy, rubber tensile strength, and abrasion resistance are improved markedly and synergistically, and therefore good fuel economy, rubber tensile strength, and abrasion resistance, especially rubber tensile strength and abrasion resistance, are achieved.

The rubber composition in the present invention is characterized by containing, in the rubber component, a hydrogenated copolymer obtained by hydrogenating the conjugated diene units of a copolymer of an aromatic vinyl compound and a conjugated diene compound. Since conventional rubbers contain a large number of double bonds at which a crosslinking reaction can take place, they will have variations in crosslink concentration which are considered to cause stress concentration that can initiate fracture. According to the present invention, the hydrogenation treatment reduces the number of double bonds, thereby reducing the number of reactive sites for crosslinking. As a result, it is expected that the variations in crosslink concentration decrease so that the stress concentration is relaxed, resulting in improvements in abrasion resistance and other properties.

Examples of the aromatic vinyl compound include styrene, α-methylstyrene, 1-vinylnaphthalene, 3-vinyltoluene, ethylvinylbenzene, divinylbenzene, 4-cyclohexylstyrene, and 2,4,6-trimethylstyrene. Each of these may be used alone, or two or more of these may be used in combination. Among these examples, styrene is particularly preferred in view of practical aspects such as the availability of monomers and because the effects of the present invention can be more suitably achieved.

Examples of the conjugated diene compound include 1,3-butadiene, isoprene, 1,3-pentadiene, 2,3-dimethylbutadiene, 2-phenyl-1,3-butadiene, and 1,3-hexadiene. Each of these may be used alone, or two or more of these may be used in combination. Among these examples, 1,3-butadiene or isoprene is preferred, with 1,3-butadiene being more preferred, in view of practical aspects such as the availability of monomers and because the effects of the present invention can be more suitably achieved.

The copolymer of an aromatic vinyl compound and a conjugated diene compound is preferably a copolymer of styrene and 1,3-butadiene (styrene-butadiene copolymer). The hydrogenated copolymer is thus preferably a hydrogenated styrene-butadiene copolymer. Furthermore, the hydrogenated styrene-butadiene copolymer is preferably a hydrogenated modified styrene-butadiene copolymer that has been modified by the method described later.

The styrene-butadiene copolymer may be prepared by copolymerization of styrene and 1,3-butadiene in any order, and may be prepared by random copolymerization or block copolymerization, and preferably by random copolymerization. The same is true for copolymers of aromatic vinyl compounds and conjugated diene compounds other than styrene-butadiene copolymers.

The degree of hydrogenation of the hydrogenated copolymer (the degree of hydrogenation of the conjugated diene units of the copolymer of an aromatic vinyl compound and a conjugated diene compound) is 75 mol % or more, preferably 80 mol % or more, more preferably 90 mol % or more, still more preferably 93 mol % or more. When the degree of hydrogenation is less than 75 mol %, rubber tensile strength and abrasion resistance are not readily improved. The degree of hydrogenation of the hydrogenated copolymer is also preferably 99 mol % or less, more preferably 98 mol % or less. When the degree of hydrogenation is more than 99 mol %, the rubber composition may become hard.

The degree of hydrogenation can be calculated from the rate of decrease in the intensity of a $^1$H-NMR spectrum corresponding to unsaturated bonds.

The hydrogenated copolymer preferably has a weight average molecular weight (Mw) of 200,000 or more, more preferably 400,000 or more. When the Mw is less than 200,000, good rubber tensile strength and good abrasion resistance may not be obtained. The Mw of the hydrogenated copolymer is also preferably 2,000,000 or less, more preferably 1,000,000 or less, still more preferably 700,000 or less. When the Mw is more than 2,000,000, processability tends to decrease.

Herein, the weight average molecular weight (Mw) and the number average molecular weight (Mn) can be determined by gel permeation chromatography (GPC) (GPC-8000 series available from Tosoh Corporation, detector: differential refractometer, column: TSKGEL SUPERMULTIPORE HZ-M available from Tosoh Corporation) relative to polystyrene standards.

The hydrogenated copolymer preferably has a glass transition temperature (Tg) of −45° C. or higher, more preferably −35° C. or higher, still more preferably −30° C. or higher, further preferably −25° C. or higher, particularly preferably −24.5° C. or higher, most preferably −24° C. or higher. When the Tg is lower than −45° C., the rubber may have reduced tensile strength. The Tg of the hydrogenated copolymer is also preferably lower than −10° C., more preferably lower than −12.5° C., still more preferably lower than −13° C., further preferably lower than −15° C., particularly preferably lower than −17.5° C., most preferably lower than −20° C. When the Tg is −10° C. or higher, the rubber may harden at low temperatures of 0° C. or lower, and therefore the durability such as abrasion resistance or rubber tensile strength may deteriorate.

The glass transition temperature (Tg) of the hydrogenated copolymer is measured as described in the Examples later.

In the case where the hydrogenated copolymer is a hydrogenated styrene-butadiene copolymer, the hydrogenated styrene-butadiene copolymer preferably has a styrene content of 5% by mass or more, more preferably 10% by mass or more, still more preferably 15% by mass or more, particularly preferably 20% by mass or more, most preferably 25% by mass or more. When the styrene content is less than 5% by mass, sufficient grip performance may not be obtained. The styrene content of the hydrogenated styrene-butadiene copolymer is also preferably 40% by mass or less, more preferably 35% by mass or less. When the styrene content is more than 40% by mass, sufficient rubber tensile strength and sufficient abrasion resistance may not be obtained, and fuel economy may also deteriorate. When the styrene content falls within the range indicated above, the effects of the present invention can be more suitably achieved.

The styrene content is measured as described in the Examples later.

The hydrogenated copolymer may be synthesized, for example, by hydrogenating a polymer obtained by polymerization of an aromatic vinyl compound and a conjugated diene compound, and specifically by the following method.

<Method for Producing Copolymer>
(Polymerization Method)

The copolymer of an aromatic vinyl compound and a conjugated diene compound may be polymerized by any method, including solution polymerization, vapor phase polymerization, and bulk polymerization, and particularly preferably by solution polymerization. The polymerization may be carried out in a batch mode or in a continuous mode.

In the case of solution polymerization, the monomer concentration (the combined concentration of styrene and 1,3-butadiene for styrene-butadiene copolymer) in the solvent is preferably 5% by mass or more, more preferably 10% by mass or more. When the monomer concentration in the solvent is less than 5% by mass, the copolymer yield tends to be small, resulting in increased cost. The monomer concentration in the solvent is also preferably 50% by mass or less, more preferably 30% by mass or less. When the monomer concentration in the solvent is more than 50% by mass, the solution tends to become too viscous to stir easily, and thus polymerization tends not to occur easily.

(Polymerization Initiator in Anionic Polymerization)

In the case of anionic polymerization, any type of polymerization initiator may be used, but preferred are organic lithium compounds. The organic lithium compound is preferably one containing a C2-C20 alkyl group, and examples include ethyllithium, n-propyllithium, isopropyllithium, n-butyllithium, sec-butyllithium, tert-butyllithium, tert-octyllithium, n-decyllithium, phenyllithium, 2-naphthyllithium, 2-butyl-phenyllithium, 4-phenyl-butyllithium, cyclohexyllithium, cyclopentyllithium, and reaction products of diisopropenylbenzene and butyllithium. In view of availability, safety and other aspects, n-butyllithium or sec-butyllithium is preferred among these.

The polymerization reaction may be carried out in the presence of a compound (R) obtained by mixing at least one of the organic lithium compounds mentioned above with a compound (B1) containing a functional group interactive with silica. When the polymerization is carried out in the presence of the compound (R), the functional group interactive with silica is introduced to the polymerization initiating terminal of the copolymer. As a result, the copolymer has a modified polymerization initiating terminal. The term "interactive" herein means the formation of a covalent bond or an intermolecular force weaker than covalent bonds (e.g. electromagnetic forces between molecules such as ion-dipole interaction, dipole-dipole interaction, hydrogen bond, or van der Waals force) between molecules. The term "functional group interactive with silica" herein refers to a group having at least one atom interactive with silica such as a nitrogen atom, a sulfur atom, a phosphorus atom, or an oxygen atom.

The compound (R) is preferably a reaction product of an organic lithium compound and a nitrogen-containing compound such as a secondary amine compound, among others. Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, and 1,3-ditrimethylsilyl-1,3,5-triazinane. Polymerization in the presence of the compound (R) may be carried out by preliminarily mixing an organic lithium compound with a compound (B1) to prepare a compound (R), and adding the compound (R) to the polymerization system followed by polymerization. Alternatively, it may be carried out by adding an organic lithium compound and a compound (B1) to the polymerization system and mixing them in the polymerization system to prepare a compound (R) followed by polymerization.

(Method for Anionic Polymerization)

The production of a copolymer through anionic polymerization using the polymerization initiator may be carried out by any method including conventionally known methods.

Specifically, styrene and 1,3-butadiene, for example, may be anionically polymerized in an organic solvent inert to the reaction, for example, a hydrocarbon solvent such as an aliphatic, alicyclic, or aromatic hydrocarbon compound, using a polymerization initiator such as butyllithium, optionally in the presence of a randomizer to produce a target copolymer such as a styrene-butadiene copolymer.

(Hydrocarbon Solvent in Anionic Polymerization)

The hydrocarbon solvent is preferably a C3-C8 hydrocarbon solvent, and examples include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. Each of these may be used alone, or two or more of these may be used in admixture.

(Randomizer in Anionic Polymerization)

The randomizer refers to a compound that has the function of controlling the microstructure of the conjugated diene units of a copolymer, for example, increase of 1,2-butadiene units or 3,4-isoprene units, or the function of controlling the compositional distribution of monomer units in a copolymer, for example, randomization of styrene units and butadiene units in a styrene-butadiene copolymer. The randomizer is not particularly limited, and any compound commonly and conventionally used as randomizer may be used. Examples include ethers and tertiary amines, such as dimethoxybenzene, tetrahydrofuran, dimethoxyethane, diethylene glycol dibutyl ether, diethylene glycol dimethyl ether, bis(tetrahydrofuryl)propane, triethylamine, pyridine, N-methylmorpholine, N,N,N',N'-tetramethylethylenediamine, and 1,2-dipiperidinoethane. Other examples include potassium salts such as potassium-t-amylate or potassium-t-butoxide; and sodium salts such as sodium-t-amylate. Each of these randomizers may be used alone, or two or more of these may be used in combination. The amount of the randomizer to be used per mol of the organic lithium compound is preferably 0.01 mole equivalents or more, more preferably 0.05 mole equivalents or more. When the amount of the randomizer is less than 0.01 mole equivalents, the effect of the added randomizer tends to be small, and thus randomization tends not to occur easily. The amount of the randomizer per mol of the organic lithium compound is also preferably 1,000 mole equivalents or less, more preferably 500 mole equivalents or less. When the amount of the randomizer is more than 1,000 mole equivalents, the reaction rate of monomers tends to change greatly, and as a result randomization tends to fail to occur easily as expected.

The Tg of the copolymer can be adjusted by controlling the type or amount of the randomizer. For example, the Tg of the copolymer may be reduced by decreasing the amount of tetrahydrofuran.

(Reaction Temperature)

The anionic polymerization may be carried out at any reaction temperature as long as the reaction suitably proceeds. Usually, the reaction temperature is preferably −10° C. to 100° C., more preferably 25° C. to 70° C.

(Modification Step)

A functional group interactive with silica can be introduced to the polymerization terminating terminal of the copolymer obtained by the above polymerization step by the step of reacting the active terminal of the copolymer with a compound (B2) containing a functional group interactive with silica. As a result, the copolymer has a modified polymerization terminating terminal. The term "terminal" herein refers to an end portion of the molecular chain, excluding monomer-derived structures containing carbon-carbon double bonds.

The copolymer used in the modification reaction (hereinafter, also referred to as terminal modification reaction) may be any copolymer which has an active terminal either with a modified or unmodified polymerization initiating terminal. The compound (B2) may be any compound which contains a functional group interactive with silica and is reactable with the polymerization active terminal. Preferable specific examples of the compound (B2) include:

(I) a compound (B2-1) represented by the following Formula (1):

wherein $A^1$ represents a monovalent functional group which contains no active hydrogen, but contains at least one selected from the group consisting of a nitrogen atom, a phosphorus atom, and a sulfur atom, and is bound to $R^5$ through a nitrogen atom, a phosphorus atom, or a sulfur atom; $R^3$ and $R^4$ each represent a hydrocarbyl group; $R^5$ represents a hydrocarbylene group; and n represents an integer of 0 to 2, provided that when two or more $R^3$ or $R^4$ groups are present, they may be the same or different;

(II) a compound (B2-2) that has, in the molecule, one or more of at least one type of functional group (x1) selected from the group consisting of a cyclic ether group, a (thio) carbonyl group, and an iso(thio)cyanate group, and one or more of a group (x2) different from the functional group (x1), which contains no active hydrogen but contains at least one selected from the group consisting of a nitrogen atom, a phosphorus atom, an oxygen atom, and a sulfur atom, provided that at least one of the nitrogen, phosphorus, and sulfur atoms may be protected by a trisubstituted hydrocarbylsilyl group; and (III) a compound (B2-3) having two or more iso(thio) cyanate groups in the molecule. Each of these compounds (B2) may be used alone, or two or more of these compounds (B2) may be used in combination. Herein, the (thio)carbonyl group refers to a carbonyl group and a thiocarbonyl group; and the iso (thio) cyanate group refers to an isocyanate group and an isothiocyanate group.

The hydrocarbyl group for $R^3$ and $R^4$ in Formula (1) is preferably a linear or branched C1-C20 alkyl group, a C3-C20 cycloalkyl group, or a C6-C20 aryl group.

$R^5$ is preferably a linear or branched C1-C20 alkanediyl group, a C3-C20 cycloalkylene group, or a C6-C20 arylene group.

Preferably, n is 0 or 1 in order to increase the reactivity with the copolymer.

$A^1$ contains at least one selected from the group consisting of a nitrogen atom, a phosphorus atom, and a sulfur atom (hereinafter, also referred to as specific atom), and is bound to $R^5$ through the specific atom. The specific atom is bound to no active hydrogen, and may be protected by, for example, a trisubstituted hydrocarbylsilyl group. The term "active hydrogen" herein refers to a hydrogen atom bound to an atom other than a carbon atom, and preferably refers to a hydrogen atom having a lower bond energy than the carbon-hydrogen bond of polymethylene.

Preferably, $A^1$ is a group that can be converted to an onium ion by the action of an onium salt-forming agent, among others. The compound (B2) containing such a group ($A^1$) can impart excellent shape-retaining properties to the copolymer to be modified.

Specific examples of $A^1$ include a nitrogen-containing group in which two hydrogen atoms of a primary amino group are substituted by two protecting groups; a nitrogen-containing group in which one hydrogen atom of a secondary amino group is substituted by one protecting group; a tertiary amino group; an imino group; a pyridyl group; a phosphorus-containing group in which two hydrogen atoms of a primary phosphino group are substituted by two protecting groups; a phosphorus-containing group in which one hydrogen atom of a secondary phosphino group is substituted by one protecting group; a tertiary phosphino group; and a sulfur-containing group in which one hydrogen atom of a thiol group is substituted by one protecting group. Among these, groups containing a nitrogen atom are preferred because they have good affinity with silica. The term "protecting group" refers to a functional group that converts $A^1$ to a functional group inert to the polymerization active terminal, for example, a trisubstituted hydrocarbylsilyl group.

Specific examples of the compound (B2-1) include compounds containing both an alkoxysilyl group and a nitrogen-containing group in which two hydrogen atoms of a primary amine are substituted by two protecting groups, a nitrogen-containing group in which one hydrogen atom of a secondary amine is substituted by one protecting group, or a tertiary amino group, such as N,N-bis(trimethylsilyl)aminopropyltrimethoxysilane, N,N-bis(trimethylsilyl)aminopropylmethyldiethoxysilane, N,N',N'-tris(trimethylsilyl)-N-(2-aminoethyl)-3-aminopropyltriethoxysilane, or 3-(4-trimethylsilyl-1-piperazino)propylmethyldimethoxysilane.

Examples of compounds containing both an alkoxysilyl group and an imino group or a pyridyl group include N-(1,3-dimethylbutylidene)-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine, and trimethoxysilyl, methyldiethoxysilyl, or ethyldimethoxysilyl compounds corresponding to the foregoing triethoxysilyl compounds, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropylmethyldimethoxysilane, and the foregoing compounds whose alkyl group and alkanediyl group are replaced with a C1-C6 alkyl group and a C1-C6 alkanediyl group, respectively.

Examples of compounds containing both an alkoxysilyl group and a phosphorus-containing group in which two hydrogen atoms of a primary phosphino group are substituted by two protecting groups, a phosphorus-containing group in which one hydrogen atom of a secondary phosphino group is substituted by one protecting group, a tertiary phosphino group, or a sulfur-containing group in which one hydrogen atom of a thiol group is substituted by one protecting group include P,P-bis(trimethylsilyl)phosphinopropylmethyldimethoxysilane, P,P-bis(trimethylsilyl)phosphinopropyltrimethoxysilane, 3-dimethylphosphinopropyltrimethoxysilane, 3-dimethylphosphinopropylmethyldimethoxysilane, 3-diphenylphosphinopropyltrimethoxysilane, 3-diphenylphosphinopropyltriethoxysilane, 3-diphenylphosphinopropylmeryldimethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, and the foregoing compounds whose alkyl group and alkanediyl group are replaced with a C1-C6 alkyl group and a C1-C6 alkanediyl group, respectively. In addition, examples of compounds containing an iso(thio)cyanate group include 3-isocyanatopropyltrimethoxysilane and 3-isocyanatopropyltriethoxysilane.

In the compound (B2-2), the group (x2) is preferably a group that contains a nitrogen atom bound to no active hydrogen, and specific examples of such compounds include:

compounds containing a cyclic ether group, such as epoxy amine compounds, e.g. tetraglycidyl-1,3-bisaminomethylcyclohexane, compounds containing a (thio)carbonyl group, such as 4-aminoacetophenones, e.g. 4-N,N-dimethylaminobenzophenone; bis(dihydrocarbylaminoalkyl)ketones, e.g. 1,7-bis(methylethylamino)-4-heptanone; dihydrocarbyl-aminoalkyl (meth)acrylates, e.g. 2-dimethylaminoethyl acrylate; hydrocarbylimidazolidinones, e.g. 1,3-dimethyl-2-imidazolidinone; N-hydrocarbylpyrrolidones, e.g. 1-phenyl-2-pyrrolidone; N-hydrocarbylcaprolactams, e.g. N-methyl-ε-caprolactam; N-dihydrocarbylformamides, e.g. N,N-diethylformamide; N,N-dihydrocarbylacetamides, e.g. N,N-dimethylacetamide; and (meth)acrylamides, e.g. N,N-dimethylacrylamide, and compounds containing an iso(thio)cyanate group, e.g. 3-isocyanatopropyltrimethoxysilane.

Examples of the compound (B2-3) include 2,4-tolylene diisocyanate, 2,6-tolylene diisocyanate, diphenylmethane diisocyanate, naphthalene diisocyanate, triphenylmethane triisocyanate, p-phenylene diisocyanate, tris(isocyanatophenyl)thiophosphate, xylene diisocyanate, benzene-1,2,4-triisocyanate, naphthalene-1,2,5,7-tetraisocyanate, and 1,4-phenylene diisothiocyanate.

In particular, the compound (B2-1) is preferably used as the compound (B2) because it has high affinity with silica. When a silane compound (B2-1) is used, silicon tetrachloride or an epoxy-containing compound such as tetraglycidyl-1,3-bisaminomethylcyclohexane, for example, may be used with the silane compound (B2-1) to control the Mooney viscosity of the modified copolymer. The compounds (B2) mentioned above all have the same function in that they allow the resulting modified copolymer to have a modified polymerization terminating terminal. Accordingly, those which are not disclosed in the Examples later can also be used in the present invention. A structure represented by Formula (1-1) below is introduced to the polymer terminal by a reaction between the compound represented by Formula (1) and the copolymer to be modified,

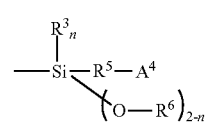

(1-1)

wherein $R^6$ represents a hydrogen atom or a hydrocarbyl group, and when two or more $R^6$ groups are present, they may be the same or different; and $A^4$, $R^3$, $R^5$ and n are as defined for $A^1$, $R^3$, $R^5$ and n, respectively, in Formula (1).

The terminal modification reaction may be carried out as a solution reaction. The solution reaction may be carried out using a solution containing unreacted monomers obtained after completion of the polymerization reaction in the above polymerization step, or may be carried out after the copolymer is isolated from the above solution and dissolved in an appropriate solvent such as cyclohexane. The terminal modification reaction may be carried out either batchwise or continuously. Here, the compound (B2) may be added by any method, for example, at one time, in portions, or continuously.

The amount of the compound (B2) used in the terminal modification reaction may be selected appropriately according to the type of compound used in the reaction. The amount of the compound (B2) is preferably 0.1 mole equivalents or more, more preferably 0.3 mole equivalents or more relative to the metal atom in the polymerization initiator which is involved in the polymerization reaction. When 0.1 mole equivalents or more of the compound (B2) is used, the modification reaction can proceed sufficiently, and the dispersibility of silica can be suitably improved.

The temperature of the terminal modification reaction is usually the same as the temperature of the polymerization reaction, and is preferably −20° C. to 150° C., more preferably 0° C. to 120° C., particularly preferably 20° C. to 100° C. When the temperature of the modification reaction is low, the viscosity of the modified copolymer tends to increase, while when the temperature of the modification reaction is high, the polymerization active terminal can be easily deactivated. The duration of the modification reaction is preferably one minute to five hours, more preferably two minutes to one hour.

(Termination of Reaction)

The anionic polymerization can be terminated by addition of a reaction terminator usually used in this technical field. Examples of the reaction terminator include polar solvents containing active protons, for example, acetic acid and alcohols such as methanol, ethanol, or isopropanol, and mixtures of the foregoing. Other examples include mixtures of the foregoing polar solvents and non-polar solvents such as hexane or cyclohexane. Usually, the amount of the reaction terminator to be added is sufficient when it is about equal to or twice the molar amount of the initiator for anionic polymerization.

<Coupling>

In the method for producing the copolymer, a coupling agent may be added to a solution of the copolymer in a hydrocarbon at any time from the initiation of the polymerization of monomers until the polymer is recovered as described later. Examples of the coupling agent include compounds represented by the following Formula (3-1):

$$R^1_a ML_{4-a} \quad (3\text{-}1)$$

wherein $R^1$ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agent represented by Formula (3-1) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

In order to enhance the processability of the polymer, the amount of the coupling agent to be added is preferably 0.03 mol or more, more preferably 0.05 mol or more, per mol of the alkali metal derived from an alkali metal catalyst. In order to enhance fuel economy, the amount is preferably 0.4 mol or less, more preferably 0.3 mol or less.

<Hydrogenation Method>

In the method for producing the hydrogenated copolymer, the copolymer described above is hydrogenated to obtain a hydrogenated copolymer having a degree of hydrogenation of 75 mol % or more. The hydrogenation of the copolymer advantageously improves heat resistance. When the degree of hydrogenation is low, the effects of improving rubber tensile strength and abrasion resistance are not sufficiently achieved.

The hydrogenation may be carried out by any method under any reaction condition, including known methods and known conditions. Usually, the hydrogenation is carried out at 20° C. to 150° C. under 0.1 to 10 MPa hydrogen pressure in the presence of a hydrogenation catalyst. The degree of hydrogenation may be set appropriately by changing, for example, the amount of the hydrogenation catalyst, the hydrogen pressure during the hydrogenation reaction, or the duration of the reaction. The hydrogenation catalyst used may be usually a compound containing any of the metals of groups 4 to 11 of the periodic table. For example, compounds containing any of Ti, V, Co, Ni, Zr, Ru, Rh, Pd, Hf, Re, and Pt atoms can be used as the hydrogenation catalyst. More specific examples of the hydrogenation catalyst include metallocene compounds containing Ti, Zr, Hf, Co, Ni, Pd, Pt, Ru, Rh, Re, or other metals; supported heterogeneous catalysts in which a metal such as Pd, Ni, Pt, Rh, or Ru is supported on a carrier such as carbon, silica, alumina, or diatomaceous earth; homogeneous Ziegler catalysts in which an organic salt or acetylacetone salt of a metal element such as Ni or Co is combined with a reducing agent such as an organoaluminum; organometallic compounds or complexes of Ru, Rh, or other metals; and fullerenes and carbon nanotubes in which hydrogen is stored.

Among the above exemplary compounds, metallocene compounds containing Ti, Zr, Hf, Co, or Ni are preferred because then the hydrogenation reaction can be carried out in a homogeneous system in an inert organic solvent. Furthermore, metallocene compounds containing Ti, Zr, or Hf are preferred. In particular, hydrogenation catalysts obtained by reacting titanocene compounds with alkyllithiums are preferred because such catalysts are inexpensive and industrially very useful. Specific examples include hydrogenation catalysts described in, for example, JP H1-275605 A, JP H5-271326 A, JP H5-271325 A, JP H5-222115 A, JP H11-292924 A, JP 2000-37632 A, JP S59-133203 A, JP S63-5401 A, JP S62-218403 A, JP H7-90017 A, JP S43-19960 B, and JP S47-40473 B. Each of these hydrogenation catalysts may be used alone, or two or more of these may be used in combination.

The amount of the hydrogenated copolymer per 100% by mass of the rubber component is 75% by mass or more, preferably 80% by mass or more, more preferably 90% by mass or more, still more preferably 100% by mass. When the amount of the hydrogenated copolymer is less than 75% by mass, the effects of improving rubber tensile strength and abrasion resistance, particularly rubber tensile strength, tend not to be easily achieved.

Particularly in the case where the hydrogenated copolymer is a hydrogenated styrene-butadiene copolymer, the amount of the hydrogenated styrene-butadiene copolymer per 100% by mass of the rubber component is preferably 90% by mass or more, more preferably 95% by mass or more, still more preferably 100% by mass.

Examples of other rubbers that may be used in addition to the hydrogenated copolymer include conventional styrene-butadiene copolymer rubber (SBR), polybutadiene rubber (BR), butadiene-isoprene copolymer rubber, and butyl rubber. Other possible examples include natural rubber (NR), ethylene-propylene copolymers, and ethylene-octene copolymers. Two or more of these rubbers may be used in combination.

In the case where NR is contained in the rubber component, non-limiting examples of the NR include those commonly used in the tire industry, such as SIR20, RSS#3, or TSR20.

The amount of NR per 100% by mass of the rubber component is preferably 5% by mass or more. The amount of NR is preferably 25% by mass or less, more preferably 15% by mass or less. The incorporation of the above amount of NR provides good fuel economy, so that a better balance of fuel economy, rubber tensile strength, and abrasion resistance is achieved.

Non-limiting examples of the silica include dry silica (anhydrous silica) and wet silica (hydrous silica). Wet silica is preferred as it contains many silanol groups.

The silica preferably has a nitrogen adsorption specific surface area ($N_2SA$) of 45 $m^2/g$ or more, more preferably 55 $m^2/g$ or more, still more preferably 60 $m^2/g$ or more, particularly preferably 100 $m^2/g$ or more, most preferably 150 $m^2/g$ or more. When the $N_2SA$ is less than 45 $m^2/g$, abrasion resistance or rubber tensile strength may deteriorate. The $N_2SA$ of the silica is also preferably 350 $m^2/g$ or less, more preferably 300 $m^2/g$ or less, still more preferably 270 $m^2/g$ or less, particularly preferably 220 $m^2/g$ or less. Silica having an $N_2SA$ of more than 350 $m^2/g$ may be difficult to disperse, and fuel economy may deteriorate.

The nitrogen adsorption specific surface area of the silica is determined by the BET method in accordance with ASTM D3037-81.

The amount of silica relative to 100 parts by mass of the rubber component is preferably 1 part by mass or more, more preferably 10 parts by mass or more, still more preferably 30 parts by mass or more, particularly preferably 45 parts by mass or more. When the amount is less than 1 part by mass, the effect produced by the incorporation of silica tends not to be sufficiently achieved, and thus fuel economy or abrasion resistance tends to deteriorate. The amount of silica is preferably 200 parts by mass or less, more preferably 150 parts by mass or less, still more preferably 120 parts by mass or less, particularly preferably 100 parts by mass or less. When the amount is more than 200 parts by mass, the silica tends not to disperse easily, with the result that fuel economy, processability, and abrasion resistance tend to deteriorate.

The rubber composition in the present invention preferably contains another filler in addition to silica. The term "filler" herein refers to a material that may be incorporated in the rubber composition to reinforce rubber. Examples include white fillers such as calcium carbonate, mica including sericite, aluminum hydroxide, magnesium oxide, magnesium hydroxide, clay, talc, alumina, titanium oxide, or mica; and carbon black. Two or more of these fillers may be used in combination. For reinforcement, carbon black is particularly preferably used.

In the case where the rubber composition in the present invention contains another filler in addition to silica, the amount of silica per 100% by mass of the total filler is preferably 80% by mass or more, more preferably 90% by mass or more. When the amount is less than 80% by mass, the effects of the present invention may not be sufficiently achieved. In this case, when carbon black is used as the other filler, wet grip performance tends to deteriorate. When fillers other than carbon black are used, abrasion resistance may deteriorate.

In the case where the rubber composition in the present invention contains carbon black, examples of the carbon black include furnace black (furnace carbon black) such as SAF, ISAF, HAF, MAF, FEF, SRF, GPF, APF, FF, CF, SCF or ECF; acetylene black (acetylene carbon black); thermal black (thermal carbon black) such as FT or MT; channel black (channel carbon black) such as EPC, MPC or CC; and graphite. Each of these may be used alone, or two or more of these may be used in combination.

The carbon black usually has a nitrogen adsorption specific surface area ($N_2SA$) of 5 to 200 $m^2/g$. The lower limit is preferably 50 $m^2/g$, more preferably 80 $m^2/g$, while the upper limit is preferably 150 $m^2/g$, more preferably 120 $m^2/g$. The carbon black usually has a dibutyl phthalate (DBP) absorption of 5 to 300 mL/100 g. The lower limit is preferably 80 mL/100 g, while the upper limit is preferably 180 mL/100 g. Carbon black having an $N_2SA$ or DBP absorption of less than the lower limit indicated above tends to have only a small reinforcing effect, resulting in reduced abrasion resistance. Carbon black having an $N_2SA$ or DBP absorption of more than the upper limit indicated above tends to disperse poorly, resulting in increased hysteresis loss and reduced fuel economy.

The nitrogen adsorption specific surface area is measured in accordance with ASTM D4820-93. The DBP absorption is measured in accordance with ASTM D2414-93.

In the case where the rubber composition in the present invention contains carbon black, the amount of carbon black relative to 100 parts by mass of the rubber component is preferably 1 part by mass or more, more preferably 3 parts by mass or more. When the amount is less than 1 part by mass, sufficient reinforcing properties may not be obtained. The amount of carbon black is preferably 60 parts by mass or less, more preferably 30 parts by mass or less, still more preferably 15 parts by mass or less. When the amount is more than 60 parts by mass, fuel economy tends to deteriorate.

The rubber composition in the present invention contains, together with silica, a silane coupling agent 1 containing a carbonylthio group (—S—C(═O)—) but no mercapto group (—SH) and/or a silane coupling agent 2 containing a mercapto group (—SH). Although the use of the above-described hydrogenated copolymer with a high degree of hydrogenation may lead to insufficient crosslink density, a good crosslink network can be formed when silica and a silane coupling agent are used together with the hydrogenated copolymer. In the present invention, by using a specific silane coupling agent (s) as the silane coupling agent, in other words, by incorporating a combination of the hydrogenated copolymer and the silane coupling agent(s) into a silica-containing rubber compound, fuel economy, rubber tensile strength, and abrasion resistance are improved markedly and synergistically.

The silane coupling agent is preferably the silane coupling agent 1 because the effects of the present invention can be more suitably achieved.

The silane coupling agent 1 containing a carbonylthio group but no mercapto group may suitably be a silane coupling agent represented by the following Formula (2-1):

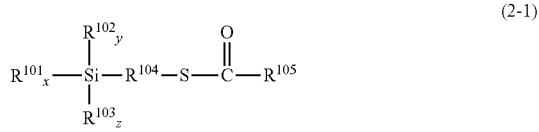

(2-1)

wherein $R^{101}$ represents a monovalent group selected from —Cl, —Br, —OR$^{106}$, —O(O=)CR$^{106}$, —ON=CR$^{106}$R$^{107}$, —ON=CR$^{106}$R$^{107}$, —NR$^{106}$R$^{107}$ or —(OSiR$^{106}$R$^{107}$)$_h$(OSiR$^{106}$R$^{107}$R$^{108}$), where $R^{106}$, $R^{107}$, and $R^{108}$ may be the same or different, and each represent a hydrogen atom or a C1-C18 monovalent hydrocarbon group, and h has a value, on average, of 1 to 4; $R^{102}$ represents $R^{101}$, a hydrogen atom, or a C1-C18 monovalent hydrocarbon group; $R^{103}$ represents $R^{101}$, $R^{102}$, a hydrogen atom, or the group: —[O(R$^{109}$O)$_j$]$_{0.5}$—, where $R^{109}$ represents a C1-C18 alkylene group, and j represents an integer of 1 to 4; $R^{104}$ represents a C1-C18 divalent hydrocarbon group; $R^{105}$ represents a C1-C18 monovalent hydrocarbon group; and x, y, and z are numbers satisfying the following relations: $x+y+2z=3$, $0 \leq x \leq 3$, $0 \leq y \leq 2$, and $0 \leq z \leq 1$.

Preferably, $R^{105}$, $R^{106}$, $R^{107}$, and $R^{108}$ in Formula (2-1) are each independently selected from the group consisting of linear, cyclic, or branched C1-C18 alkyl, alkenyl, aryl or aralkyl groups. When $R^{102}$ is a C1-C18 monovalent hydrocarbon group, the group is preferably selected from the group consisting of linear, cyclic, or branched alkyl, alkenyl, aryl, or aralkyl groups. $R^{109}$ is preferably a linear, cyclic, or branched alkylene group, particularly preferably a linear alkylene group. $R^{104}$ may be, for example, a C1-C18 alkylene group, a C2-C18 alkenylene group, a C5-C18 cycloalkylene group, a C6-C18 cycloalkylalkylene group, a C6-C18 arylene group, or a C7-C18 aralkylene group. The alkylene group and alkenylene group may be either linear or branched. The cycloalkylene group, cycloalkylalkylene group, arylene group, and aralkylene group each may have a functional group such as a lower alkyl group on the ring. The $R^{104}$ is preferably a C1-C6 alkylene group, particularly preferably a linear alkylene group such as a methylene group, an ethylene group, a trimethylene group, a tetramethylene group, a pentamethylene group, or a hexamethylene group.

Specific examples of $R^{102}$, $R^{105}$, $R^{106}$, $R^{107}$, and $R^{108}$ in Formula (2-1) include a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, a xylyl group, a naphthyl group, a benzyl group, a phenethyl group, and a naphthylmethyl group.

Examples of the linear alkylene group for $R^{109}$ in Formula (2-1) include a methylene group, an ethylene group, an n-propylene group, an n-butylene group, and a hexylene group. Examples of the branched alkylene group for $R^{109}$ include an isopropylene group, an isobutylene group, and a 2-methylpropylene group.

Specific examples of the silane coupling agent 1 represented by Formula (2-1) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, and 2-lauroylthioethyltrimethoxysilane. Among these, 3-octanoylthiopropyltriethoxysilane (NXT available from Momentive) is particularly preferred in order to simultaneously achieve processability and fuel economy. Each of these silane coupling agents may be used alone, or two or more of these may be used in combination.

The silane coupling agent 2 containing a mercapto group may suitably be a silane coupling agent containing a linking unit A represented by Formula (2-2) below and a linking unit B represented by Formula (2-3) below,

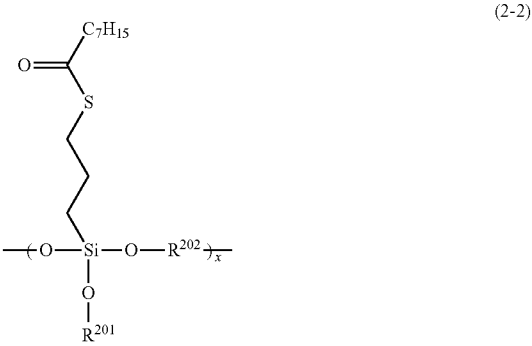

(2-2)

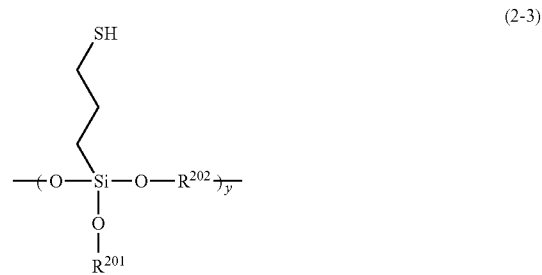

(2-3)

wherein x represents an integer of 0 or more; y represents an integer of 1 or more; $R^{201}$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxy group or a carboxyl group; $R^{202}$ represents a branched or unbranched C1-C30 alkylene group, a branched or unbranched C2-C30 alkenylene group, or a branched or unbranched C2-C30 alkynylene group; and $R^{201}$ and $R^{202}$ may together form a cyclic structure.

In the case where the silane coupling agent containing a linking unit A represented by Formula (2-2) and a linking unit B represented by Formula (2-3) is used, the increase in viscosity during the processing is suppressed as compared to the case where polysulfidesilane such as bis(3-triethoxysilylpropyl)tetrasulfide is used. This is presumably because, since the sulfide moiety of the linking unit A is a C—S—C bond, the silane coupling agent is thermally more stable than tetrasulfide or disulfide, and thus the Mooney viscosity is less likely to increase.

Furthermore, the decrease in scorch time is reduced compared to the case where mercaptosilane such as 3-mercaptopropyltrimethoxysilane is used. This is presumably because, though the linking unit A has a mercaptosilane structure, the —$C_7H_{15}$ moiety of the linking unit A covers the —SH group of the linking unit B, as a result of which the SH group is less likely to react with polymers, and thus scorch is less likely to occur.

In view of processability, the amount of the linking unit A in the silane coupling agent 2 with the above structure is preferably 30 mol % or more, more preferably 50 mol % or more, but preferably 99 mol % or less, more preferably 90 mol % or less. In view of reactivity with silica, the amount of the linking unit B is preferably 1 mol % or more, more preferably 5 mol % or more, still more preferably 10 mol % or more, but preferably 70 mol % or less, more preferably 65 mol % or less, still more preferably 55 mol % or less. The combined amount of the linking units A and B is preferably 95 mol % or more, more preferably 98 mol % or more, particularly preferably 100 mol %.

The amount of the linking unit A or B refers to the amount including the linking unit A or B present at the terminal of the silane coupling agent, if any. In the case where the linking unit A or B is present at the terminal of the silane coupling agent, its form is not particularly limited as long as it forms a unit corresponding to Formula (2-2) representing the linking unit A or Formula (2-3) representing the linking unit B.

Examples of the halogen atom for $R^{201}$ include chlorine, bromine, and fluorine.

Examples of the branched or unbranched C1-C30 alkyl group for $R^{201}$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, and a decyl group. The alkyl group preferably has 1 to 12 carbon atoms.

Examples of the branched or unbranched C2-C30 alkenyl group for $R^{201}$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. The alkenyl group preferably has 2 to 12 carbon atoms.

Examples of the branched or unbranched C2-C30 alkynyl group for $R^{201}$ include an ethynyl group, a propynyl group, a butynyl group, a pentynyl group, a hexynyl group, a heptynyl group, an octynyl group, a nonynyl group, a decynyl group, an undecynyl group, and a dodecynyl group. The alkynyl group preferably has 2 to 12 carbon atoms.

Examples of the branched or unbranched C1-C30 alkylene group for $R^{202}$ include an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group. The alkylene group preferably has 1 to 12 carbon atoms.

Examples of the branched or unbranched C2-C30 alkenylene group for $R^{202}$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group. The alkenylene group preferably has 2 to 12 carbon atoms.

Examples of the branched or unbranched C2-C30 alkynylene group for $R^{202}$ include an ethynylene group, a propynylene group, a butynylene group, a pentynylene group, a hexynylene group, a heptynylene group, an octynylene group, a nonynylene group, a decynylene group, an undecynylene group, and a dodecynylene group. The alkynylene group preferably has 2 to 12 carbon atoms.

In the silane coupling agent 2 containing a linking unit A represented by Formula (2-2) and a linking unit B represented by Formula (2-3), the total number of repetitions (x+y) consisting of the sum of the number of repetitions (x) of the linking unit A and the number of repetitions (y) of the linking unit B is preferably in the range of 3 to 300. When the total number of repetitions falls within the above range, the —$C_7H_{15}$ moiety of the linking unit A covers the mercaptosilane of the linking unit B, which reduces the decrease in scorch time and also ensures good reactivity with silica and the rubber component.

Examples of the silane coupling agent 2 containing a linking unit A represented by Formula (2-2) and a linking unit B represented by Formula (2-3) include NXT-Z30, NXT-Z45, and NXT-Z60 all available from Momentive. Each of these may be used alone, or two or more of these may be used in combination.

The silane coupling agent 1 and the silane coupling agent 2 may be used alone or in combination.

The combined amount of the silane coupling agent 1 and the silane coupling agent 2 relative to 100 parts by mass of silica is preferably 0.5 parts by mass or more, more preferably 1 part by mass or more, still more preferably 5 parts by mass or more. A combined amount of less than 0.5 parts by mass tends to have an insufficient coupling effect and also tends not to allow for high dispersion of silica. As a result, rubber tensile strength may be reduced. The combined amount of the silane coupling agent 1 and the silane coupling agent 2 relative to 100 parts by mass of silica is also preferably 15 parts by mass or less, more preferably 12 parts by mass or less, still more preferably 10 parts by mass or less. When the combined amount is more than 15 parts by mass, excess silane coupling agents may be left in the rubber composition, leading to reduction in the processability and tensile properties of the rubber composition.

The rubber composition in the present invention may further contain silane coupling agents other than the above-described silane coupling agents, including conventionally known ones. Examples include: sulfide silane coupling agents such as bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyltetrasulfide, 3-trimethoxysilylpropylbenzothiazolyltetrasulfide, 3-triethoxysilylpropylbenzothiazoletetrasulfide, 3-triethoxysilylpropyl methacrylate monosulfide, and 3-trimethoxysilylpropyl methacrylate monosulfide; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane, and 2-chloroethyltriethoxysilane. Each of these silane coupling agents may be used alone, or two or more of these may be used in combination.

The rubber composition in the present invention may contain compounding agents conventionally used in the rubber industry in addition to the above-described components. Examples include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organic peroxides; processing aids such as extender oil (oil) and lubricants; and antioxidants.

Examples of the extender oil (oil) include aromatic mineral oils (viscosity gravity constant (V.G.C.): 0.900 to 1.049), naphthenic mineral oils (V.G.C.: 0.850 to 0.899), and paraffinic mineral oils (V.G.C.: 0.790 to 0.849). The polycyclic aromatic content of the extender oil is preferably less than 3% by mass, more preferably less than 1% by mass. The polycyclic aromatic content is measured in accordance with the Institute of Petroleum (IP, U.K.) 346/92 method. The aromatic content (CA) of the extender oil is preferably 20% by mass or more. Two or more of these extender oils may be used in combination.

Examples of the vulcanization accelerator include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. Preferred among these are sulfenamide vulcanization accelerators, with N-cyclohexyl-2-benzothiazolesulfenamide being more preferred, because the effects of the present invention can be more suitably achieved. They are also preferably combined with guanidine vulcanization accelerators. The amount of vulcanization accelerator is preferably 0.1 to 5 parts by mass, more preferably 0.2 to 4 parts by mass, relative to 100 parts by mass of the rubber component.

Non-limiting suitable examples of the vulcanizing agent include sulfur. The amount of sulfur relative to 100 parts by mass of the rubber component is preferably 0.5 to 5 parts by mass, more preferably 1 to 3 parts by mass. In such cases, the effects of the present invention can be more suitably achieved.

The rubber composition in the present invention can be prepared by usual methods. Specifically, for example, the components described above are kneaded with a Banbury mixer, a kneader, an open roll mill, or the like, and the kneaded mixture is vulcanized, whereby the rubber composition can be prepared.

The rubber composition in the present invention may be used for tire components, such as treads, sidewalls, carcasses, belts, beads, clinches, or chafers, and is especially suitable for treads of tires. A two-layer tread consists of an outer surface layer (cap tread) and an inner surface layer (base tread).

A multi-layer tread can be prepared by forming the rubber composition into a sheet, and assembling the sheets into a predetermined shape, or by feeding the rubber composition into an extruder with two or more screws, and forming it into a two- or more-layered extrudate at the head outlet of the extruder.

The pneumatic tire of the present invention can be formed from the rubber composition by conventional methods. Specifically, a rubber composition that incorporates a rubber component containing a hydrogenated copolymer and optionally the aforementioned compounding agents, before vulcanization, is extruded and processed into a tire component such as a tread and assembled with other tire components in a conventional manner on a tire building machine to build an unvulcanized tire. The unvulcanized tire is heated and pressurized in a vulcanizer, whereby a pneumatic tire of the present invention can be produced.

The pneumatic tire of the present invention is suitable for passenger vehicles, trucks and buses, two-wheeled vehicles, racing vehicles, and other vehicles and especially for passenger vehicles.

EXAMPLES

The present invention is specifically described with reference to, but not limited to, examples below.

The chemicals used in the synthesis or polymerization are collectively listed below. The chemicals were purified as needed by conventional techniques.

n-Hexane: Product of Kanto Chemical Co., Inc.
Styrene: Product of Kanto Chemical Co., Inc.
Butadiene: 1,3-butadiene available from Tokyo Chemical Industry Co., Ltd.
TMEDA: N,N,N',N'-tetramethylethylenediamine available from Kanto Chemical Co., Inc.
n-Butyllithium solution: 1.6 M solution of n-butyllithium in hexane available from Kanto Chemical Co., Inc.
Ethanol: Product of Kanto Chemical Co., Inc.
2,6-Di-tert-butyl-p-cresol: Nocrac 200 available from Ouchi Shinko Chemical Industrial Co., Ltd.
Amine modifier: N,N-bis(trimethylsilyl)-aminopropylmethyldiethoxysilane The methods for evaluating the prepared copolymers are collectively described below.
(Measurement of Degree of Hydrogenation of Conjugated Diene Units of Copolymer)

A 15% by mass solution of each copolymer in carbon tetrachloride was prepared to measure a $^1$H-NMR spectrum at 100 MHz. The degree of hydrogenation was calculated from the rate of decrease in the intensity of the $^1$H-NMR spectrum corresponding to unsaturated bonds.
(Measurement of Styrene Content)

A $^1$H-NMR spectrum was measured using a JEOL JNM-A 400 NMR device at 25° C. The ratio of phenyl protons of the styrene unit at 6.5 to 7.2 ppm to vinyl protons of the butadiene unit at 4.9 to 5.4 ppm was determined based on the spectrum. The styrene content was calculated from the ratio.
(Measurement of Weight Average Molecular Weight (Mw) and Number Average Molecular Weight (Mn))

The weight average molecular weight (Mw) and number average molecular weight (Mn) of each copolymer were determined by gel permeation chromatography (GPC) (GPC-8000 series available from Tosoh Corporation, detector: differential refractometer, column: TSKGEL SUPERMULTIPORE HZ-M available from Tosoh Corporation) relative to polystyrene standards. In the case of copolymers containing a modifying group, the Mw and Mn were measured before the copolymers were modified. This is because the Mw and Mn of copolymers containing a modifying group are not accurately determinable due to interaction between the modifying group and silica gel in the column.
(Measurement of Glass Transition Temperature (Tg))

The glass transition onset temperature was measured in accordance with JIS K 7121 using a differential scanning calorimeter (Q200) available from TA instruments Japan Inc. while increasing the temperature at a rate of temperature rise of 10° C./min. The glass transition onset temperature was taken as the glass transition temperature (Tg).

<Copolymer Production Examples>

Synthesis Example 1 (Synthesis of Copolymer (1): SBR with a Degree of Hydrogenation of 0 Mol %)

To a sufficiently nitrogen-purged heat-resistant reaction vessel were charged 2,000 mL of n-hexane, 60 g of styrene, 140 g of butadiene, 0.93 g of TMEDA, and 0.45 mmol of n-butyllithium, followed by stirring at 50° C. for 5 hours to cause a polymerization reaction. After the reaction was terminated by addition of ethanol, 1 g of 2,6-di-tert-butyl-p-cresol was added to the reaction solution. The resulting solution was purified by reprecipitation, thereby obtaining Copolymer (1). The Copolymer (1) had a weight average molecular weight (Mw) of 490,000, and a styrene content of 30% by mass.

Synthesis Example 2 (Synthesis of Copolymer (2): Hydrogenated SBR with a Degree of Hydrogenation of 60 Mol %)

Copolymer (2) was produced as in the synthesis of Copolymer (1), except that the obtained polymer was hydrogenated. Specifically, after the polymerization conversion reaction in the synthesis of Copolymer (1), the polymerization reaction was not terminated by addition of ethanol. Instead, the reaction solution was then stirred for 20 minutes while supplying hydrogen gas at a pressure of 0.4 MPa gauge to react the unreacted polymer terminal lithium with hydrogen into lithium hydride. Hydrogenation was carried out using a titanocene dichloride-based catalyst at a hydrogen gas supply pressure of 0.7 MPa gauge and a reaction temperature of 90° C. Once the cumulative amount of absorbed hydrogen reached the amount corresponding to the target degree of hydrogenation, the reaction temperature was brought to room temperature and the hydrogen pressure was returned to an ordinary pressure, and then the reaction solution was drawn from the reaction vessel and introduced into water with stirring. The solvent was removed by steam stripping to obtain Copolymer (2). The Copolymer (2) had a degree of hydrogenation of 60 mol % and a weight average molecular weight (Mw) of 450,000.

Synthesis Example 3 (Synthesis of Copolymer (3): Hydrogenated SBR with a Degree of Hydrogenation of 80 Mol %)

Copolymer (3) was produced as in the synthesis of Copolymer (2), except that the cumulative amount of absorbed hydrogen was adjusted so as to correspond to the target degree of hydrogenation. The Copolymer (3) had a degree of hydrogenation of 80 mol % and a weight average molecular weight (Mw) of 480,000.

Synthesis Example 4 (Synthesis of Copolymer (4): Hydrogenated SBR with a Degree of Hydrogenation of 95 Mol %)

Copolymer (4) was produced as in the synthesis of Copolymer (2), except that the cumulative amount of absorbed hydrogen was adjusted so as to correspond to the target degree of hydrogenation. The Copolymer (4) had a degree of hydrogenation of 95 mol % and a weight average molecular weight (Mw) of 450,000.

Synthesis Example 5 (Synthesis of Copolymer (5): Hydrogenated Modified SBR with a Degree of Hydrogenation of 95 Mol %)

To a sufficiently nitrogen-purged heat-resistant reaction vessel were charged 2,000 mL of n-hexane, 60 g of styrene, 140 g of 1,3-butadiene, 0.93 g of TMEDA, and 0.45 mmol of n-butyllithium, followed by stirring at 50° C. for 5 hours to cause a polymerization reaction. Then, 0.15 mol of an amine modifier was added and stirred at 0° C. for 1 hour. The subsequent procedure was as described in the synthesis of Copolymer (2), except for the adjustment of the cumulative amount of absorbed hydrogen. In this way, Copolymer (5) was produced. The Copolymer (5) had a degree of hydrogenation of 95 mol % and a weight average molecular weight (Mw) before the modification of 460,000.

TABLE 1

|  | Co-polymer (1) | Co-polymer (2) | Co-polymer (3) | Co-polymer (4) | Co-polymer (5) |
|---|---|---|---|---|---|
| Degree of hydrogenation (mol %) | 0 | 60 | 80 | 95 | 95 |
| Styrene content (% by mass) | 30 | 30 | 30 | 30 | 30 |
| Butadiene content (% by mass) | 70 | 70 | 70 | 70 | 70 |
| Weight average molecular weight (Mw) | 490,000 | 450,000 | 480,000 | 450,000 | 460,000 |
| Mw/Mn | 1.18 | 1.19 | 1.22 | 1.18 | 1.21 |
| Glass transition temperature (Tg) (° C.) | −30 | −31 | −30 | −30 | −30 |

The chemicals used in the examples and comparative examples are listed below.

Copolymers (1) to (5): Copolymers synthesized by the above methods

Natural rubber: TSR20

Carbon black: Diablack N339 ($N_2SA$: 96 m²/g, DBP absorption: 124 mL/100 g) available from Mitsubishi Chemical Corporation Oil: X-140 available from JX Nippon Oil & Energy Corporation Silica: ULTRASIL VN3 ($N_2SA$: 180 m²/g) available from EVONIK Silane coupling agent A: Si69 (bis(3-triethoxysilylpropyl) tetrasulfide) available from Degussa Silane coupling agent B: NXT (3-octanoylthiopropyl-triethoxysilane) available from Momentive Silane coupling agent C: NXT-Z45 (a copolymer of linking units A and B, linking unit A: 55 mol %, linking unit B: 45 mol %) available from Momentive Antioxidant: Antigene 3C available from Sumitomo Chemical Co., Ltd.

Stearic acid: Stearic acid beads "TSUBAKI" available from NOF Corporation

Zinc oxide: Zinc oxide #1 available from Mitsui Mining & Smelting Co., Ltd.

Wax: Sunnoc N available from Ouchi Shinko Chemical Industrial Co., Ltd.

Sulfur: Sulfur powder available from Tsurumi Chemical Industry Co., Ltd.

Vulcanization accelerator (1): Soxinol CZ (N-cyclohexyl-2-benzothiazolylsulfenamide) available from Sumitomo Chemical Co., Ltd.

Vulcanization accelerator (2): Soxinol D (1,3-diphenylguanidine) available from Sumitomo Chemical Co., Ltd.

Examples and Comparative Examples

According to the formulations shown in Tables 2 to 4, the materials other than the sulfur and vulcanization accelerators were kneaded for 5 minutes at 150° C. using a 1.7-L Banbury mixer (available from Kobe Steel, Ltd.) to give a kneaded mixture. Then, the sulfur and vulcanization accelerators were added to the kneaded mixture, followed by kneading for 5 minutes at 80° C. using an open roll mill to give an unvulcanized rubber composition. The unvulcanized rubber composition was press-vulcanized for 20 minutes at 170° C. in a 0.5 mm-thick die to obtain a vulcanized rubber composition.

<Evaluation Items and Test Methods>

The vulcanized rubber compositions prepared as above were evaluated for the following items. Tables 2 to 4 show the results.

(Rubber Tensile Strength)

The vulcanized rubber compositions were subjected to a tensile test in accordance with JIS K 6251 to measure the elongation at break. The results are expressed as an index, with Comparative Example 1 set equal to 100. A higher index indicates greater rubber tensile strength.

(Rubber tensile strength index)=(Rubber tensile strength of each formulation)/(Rubber tensile strength of Comparative Example 1)×100

(Abrasion Resistance)

The volume loss of each vulcanized rubber composition was measured with a laboratory abrasion and skid tester (LAT tester) at a load of 50 N, a speed of 20 km/h, and a slip angle of 5 degrees. The volume losses are expressed as an index, with Comparative Example 1 set equal to 100. A higher index indicates better abrasion resistance.

(Fuel economy)

The tan δ of the vulcanized rubber compositions was measured at a dynamic strain amplitude of 1%, a frequency of 10 Hz, and a temperature of 50° C. using a spectrometer (available from Ueshima Seisakusho Co., Ltd.). The reciprocals of the tan δ values are expressed as an index, with Comparative Example 1 set equal to 100. A higher index indicates a smaller rolling resistance, which in turn indicates better fuel economy.

TABLE 2

|  |  | Degree of hydrogenation (mol %) | Comparative Example 1 | Comparative Example 2 | Comparative Example 3 | Comparative Example 4 |
|---|---|---|---|---|---|---|
| Formulation (parts by mass) | Copolymer (1) | 0 | 100 | — | — | — |
|  | Copolymer (2) | 60 | — | 100 | — | — |
|  | Copolymer (3) | 80 | — | — | 100 | — |
|  | Copolymer (4) | 95 | — | — | — | 100 |
|  | Copolymer (5) | 95 | — | — | — | — |
|  | Natural rubber | — | — | — | — | — |
|  | Carbon black | — | 5 | 5 | 5 | 5 |
|  | Oil | — | 25 | 25 | 25 | 25 |
|  | Silica | — | 75 | 75 | 75 | 75 |
|  | Silane coupling agent A(Si69) | — | 6 | 6 | 6 | 6 |
|  | Antioxidant | — | 1.5 | 1.5 | 1.5 | 1.5 |
|  | Stearic acid | — | 2 | 2 | 2 | 2 |
|  | Zinc oxide | — | 2.5 | 2.5 | 2.5 | 2.5 |
|  | Wax | — | 1 | 1 | 1 | 1 |
|  | Sulfur | — | 2 | 2 | 2 | 2 |
|  | Vulcanization accelerator (1) | — | 1.8 | 1.8 | 1.8 | 1.8 |
|  | Vulcanization accelerator (2) | — | 1.2 | 1.2 | 1.2 | 1.2 |
| Evaluation | Rubber tensile strength index | — | 100 | 100 | 195 | 210 |
|  | Abrasion resistance index | — | 100 | 100 | 120 | 135 |
|  | Fuel economy index | — | 100 | 100 | 99 | 99 |

|  |  | Comparative Example 5 | Comparative Example 6 | Comparative Example 7 |
|---|---|---|---|---|
| Formulation (parts by mass) | Copolymer (1) | — | — | — |
|  | Copolymer (2) | — | — | — |
|  | Copolymer (3) | — | — | — |
|  | Copolymer (4) | — | 90 | 70 |
|  | Copolymer (5) | 100 | — | — |
|  | Natural rubber | — | 10 | 30 |
|  | Carbon black | 5 | 5 | 5 |
|  | Oil | 25 | 25 | 25 |
|  | Silica | 75 | 75 | 75 |
|  | Silane coupling agent A(Si69) | 6 | 6 | 6 |
|  | Antioxidant | 1.5 | 1.5 | 1.5 |
|  | Stearic acid | 2 | 2 | 2 |
|  | Zinc oxide | 2.5 | 2.5 | 2.5 |

TABLE 2-continued

| | | | | | |
|---|---|---|---|---|---|
| | | Wax | 1 | 1 | 1 |
| | | Sulfur | 2 | 2 | 2 |
| | | Vulcanization accelerator (1) | 1.8 | 1.8 | 1.8 |
| | | Vulcanization accelerator (2) | 1.2 | 1.2 | 1.2 |
| | Evaluation | Rubber tensile strength index | 212 | 147 | 84 |
| | | Abrasion resistance index | 138 | 130 | 115 |
| | | Fuel economy index | 108 | 104 | 105 |

TABLE 3

| | | Degree of hydrogenation (mol %) | Comparative Example 4 | Example 1 | Example 2 | Example 3 | Example 4 |
|---|---|---|---|---|---|---|---|
| Formulation (parts by mass) | Copolymer (4) | 95 | 100 | 100 | 100 | 100 | 100 |
| | Natural rubber | — | — | — | — | — | — |
| | Carbon black | — | 5 | 5 | 5 | 5 | 5 |
| | Oil | — | 25 | 25 | 25 | 25 | 25 |
| | Silica | — | 75 | 75 | 75 | 75 | 75 |
| | Silane coupling agent A(Si69) | — | 6.0 | — | — | — | — |
| | Silane coupling agent B(NXT) | — | — | 0.8 | 1.5 | 3.0 | 4.5 |
| | Silane coupling agent C(NXT-Z45) | — | — | — | — | — | — |
| | Antioxidant | — | 1.5 | 1.5 | 1.5 | 1.5 | 1.5 |
| | Stearic acid | — | 2 | 2 | 2 | 2 | 2 |
| | Zinc oxide | — | 2.5 | 2.5 | 2.5 | 2.5 | 2.5 |
| | Wax | — | 1 | 1 | 1 | 1 | 1 |
| | Sulfur | — | 2 | 2 | 2 | 2 | 2 |
| | Vulcanization accelerator (1) | — | 1.8 | 1.8 | 1.8 | 1.8 | 1.8 |
| | Vulcanization accelerator (2) | — | 1.2 | 1.2 | 1.2 | 1.2 | 1.2 |
| Evaluation | Rubber tensile strength index | — | 210 | 190 | 195 | 200 | 205 |
| | Abrasion resistance index | — | 135 | 115 | 120 | 125 | 130 |
| | Fuel economy index | — | 99 | 102 | 104 | 109 | 114 |

| | | | Example 5 | Example 6 | Example 7 | Example 8 |
|---|---|---|---|---|---|---|
| | Formulation (parts by mass) | Copolymer (4) | 100 | 100 | 100 | 90 |
| | | Natural rubber | — | — | — | 10 |
| | | Carbon black | 5 | 5 | 5 | 5 |
| | | Oil | 25 | 25 | 25 | 25 |
| | | Silica | 75 | 75 | 75 | 75 |
| | | Silane coupling agent A(Si69) | — | — | — | — |
| | | Silane coupling agent B(NXT) | 6.0 | 7.5 | — | 6.0 |
| | | Silane coupling agent C(NXT-Z45) | — | — | 6.0 | — |
| | | Antioxidant | 1.5 | 1.5 | 1.5 | 1.5 |
| | | Stearic acid | 2 | 2 | 2 | 2 |
| | | Zinc oxide | 2.5 | 2.5 | 2.5 | 2.5 |
| | | Wax | 1 | 1 | 1 | 1 |
| | | Sulfur | 2 | 2 | 2 | 2 |
| | | Vulcanization accelerator (1) | 1.8 | 1.8 | 1.8 | 1.8 |
| | | Vulcanization accelerator (2) | 1.2 | 1.2 | 1.2 | 1.2 |
| | Evaluation | Rubber tensile strength index | 220 | 205 | 218 | 180 |
| | | Abrasion resistance index | 150 | 130 | 148 | 120 |
| | | Fuel economy index | 119 | 114 | 117 | 125 |

TABLE 4

| | | Degree of hydrogenation (mol %) | Comparative Example 5 | Example 9 | Example 10 | Example 11 | Example 12 |
|---|---|---|---|---|---|---|---|
| Formulation (parts by mass) | Copolymer (5) | 95 | 100 | 100 | 100 | 100 | 100 |
| | Natural rubber | — | — | — | — | — | — |
| | Carbon black | — | 5 | 5 | 5 | 5 | 5 |
| | Oil | — | 25 | 25 | 25 | 25 | 25 |
| | Silica | — | 75 | 75 | 75 | 75 | 75 |
| | Silane coupling agent A(Si69) | — | 6.0 | — | — | — | — |
| | Silane coupling agent B(NXT) | — | — | 0.8 | 1.5 | 3.0 | 4.5 |
| | Silane coupling agent C(NXT-Z45) | — | — | — | — | — | — |
| | Antioxidant | — | 1.5 | 1.5 | 1.5 | 1.5 | 1.5 |
| | Stearic acid | — | 2 | 2 | 2 | 2 | 2 |
| | Zinc oxide | — | 2.5 | 2.5 | 2.5 | 2.5 | 2.5 |
| | Wax | — | 1 | 1 | 1 | 1 | 1 |
| | Sulfur | — | 2 | 2 | 2 | 2 | 2 |
| | Vulcanization accelerator (1) | — | 1.8 | 1.8 | 1.8 | 1.8 | 1.8 |
| | Vulcanization accelerator (2) | — | 1.2 | 1.2 | 1.2 | 1.2 | 1.2 |
| Evaluation | Rubber tensile strength index | | 212 | 192 | 197 | 201 | 207 |
| | Abrasion resistance index | | 138 | 116 | 121 | 126 | 132 |
| | Fuel economy index | | 108 | 111 | 114 | 118 | 124 |

| | | | Example 13 | Example 14 | Example 15 | Example 16 |
|---|---|---|---|---|---|---|
| Formulation (parts by mass) | Copolymer (5) | | 100 | 100 | 100 | 90 |
| | Natural rubber | | — | — | — | 10 |
| | Carbon black | | 5 | 5 | 5 | 5 |
| | Oil | | 25 | 25 | 25 | 25 |
| | Silica | | 75 | 75 | 75 | 75 |
| | Silane coupling agent A(Si69) | | — | — | — | — |
| | Silane coupling agent B(NXT) | | 6.0 | 7.5 | — | 6.0 |
| | Silane coupling agent C(NXT-Z45) | | — | — | 6.0 | — |
| | Antioxidant | | 1.5 | 1.5 | 1.5 | 1.5 |
| | Stearic acid | | 2 | 2 | 2 | 2 |
| | Zinc oxide | | 2.5 | 2.5 | 2.5 | 2.5 |
| | Wax | | 1 | 1 | 1 | 1 |
| | Sulfur | | 2 | 2 | 2 | 2 |
| | Vulcanization accelerator (1) | | 1.8 | 1.8 | 1.8 | 1.8 |
| | Vulcanization accelerator (2) | | 1.2 | 1.2 | 1.2 | 1.2 |
| Evaluation | Rubber tensile strength index | | 225 | 208 | 220 | 183 |
| | Abrasion resistance index | | 152 | 132 | 149 | 122 |
| | Fuel economy index | | 128 | 125 | 126 | 134 |

Tables 2 to 4 demonstrated that fuel economy, rubber tensile strength, and abrasion resistance were markedly improved in Examples 1 to 16 using rubber compositions each of which contained, per 100% by mass of the rubber component, 75% by mass or more of a hydrogenated styrene-butadiene copolymer having a degree of hydrogenation of 75 mol % or more, and further contained silica and either the silane coupling agent B (a silane coupling agent containing a carbonylthio group but no mercapto group) or the silane coupling agent C (a silane coupling agent containing a mercapto group).

The invention claimed is:

1. A pneumatic tire, formed from a rubber composition, the rubber composition comprising:
   a hydrogenated styrene-butadiene copolymer which is a random copolymer of a styrene and a 1,3-butadiene, wherein the styrene-butadiene hydrogenated copolymer has a degree of hydrogenation of the butadiene units of 90 mol % to 99 mol %, and a styrene content of 30% by mass or more;
   silica; and
   at least one of
   a first silane coupling agent represented by the following Formula (2-1):

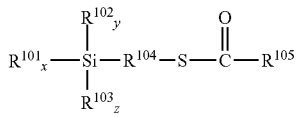

(2-1)

wherein
   $R^{101}$ represents a monovalent group selected from —Cl, —Br, —OR$^{106}$, —O(O=)CR$^{106}$, —ON=CR$^{106}R^{107}$, —ON=CR$^{106}R^{107}$, —NR$^{106}R^{107}$ or —(OSiR$^{106}$ R$^{107}$)$_h$(OSiR$^{106}R^{108}$), where R$^{106}$, R$^{107}$, and R$^{108}$ may be the same or different, and each represent a hydrogen atom or a C1-C18 monovalent hydrocarbon group, and h has a value, on average, of 1 to 4;
   $R^{102}$ represents $R^{101}$, a hydrogen atom, or a C1-C18 monovalent hydrocarbon group;
   $R^{103}$ reprersents $R^{101}$, $R^{102}$, a hydrogen atom, or the group: —[O(R$^{109}$O)$_j$]$_{0.5}$—, where $R^{109}$ represents a C1-C18 alkylene group, and j represents an integer of 1 to 4;
   $R^{104}$ represents a C1-C18 divalent hydrocarbon group;
   $R^{105}$ represents a C1-C18 monovalent hydrocarbon group; and
   x, y, and z are numbers satisfying the following relations: x+y+2z=3, 0≤x≤3, 0≤y≤2, and 0 ≤z≤1,
or
   a second silane coupling agent comprising a linking unit A represented by Formula (2-2) below and a linking unit B represented by Formula (2-3) below:

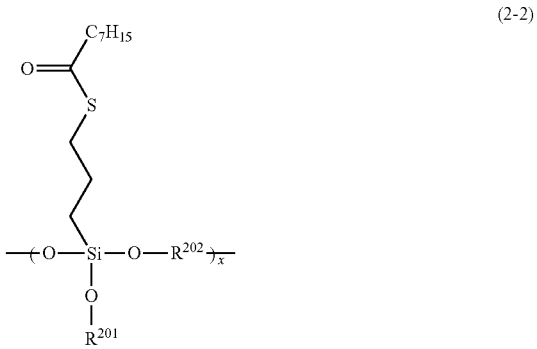

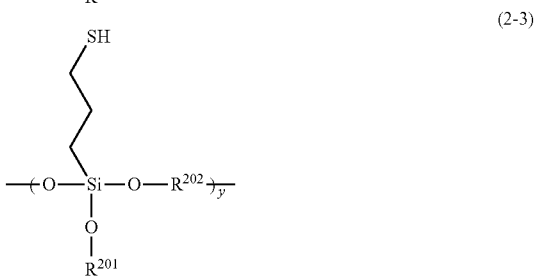

wherein
   x represents an integer of 0 or more;
   y represents an integer of 1 or more;
   $R^{201}$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxy group or a carboxyl group; and
   $R^{202}$ represents a branched or unbranched C1-C30 alkylene group, a branched or unbranched C2-C30 alkenylene group, or a branched or unbranched C2-C30 alkynylene group; and $R^{201}$ and $R^{202}$ may together form a cyclic structure,
   the rubber composition comprising, per 100% by mass of a rubber component, 90% to 100% by mass or more of the hydrogenated copolymer,
   the silica being present in amounts of 45 to 100 parts by mass relative to 100 parts by mass of the rubber component, and
   the first silane coupling agent and/or the second silane coupling agent being present in a combined amount of 1 to 10 parts by mass relative to 100 parts by mass of the silica.

2. The pneumatic tire according to claim 1, wherein the hydrogenated styrene-butadiene copolymer has a weight average molecular weight of 200,000 to 2,000,000.

3. The pneumatic tire according to claim 2, wherein the rubber composition further comprises carbon black, and the carbon black is present in amounts of 1 part by mass or more relative to 100 parts by mass of the rubber component.

4. The pneumatic tire according to claim 1, wherein the hydrogenated styrene-butadiene copolymer is a hydrogenated modified styrene-butadiene copolymer.

5. The pneumatic tire according to claim 4, wherein the hydrogenated styrene-butadiene copolymer has a styrene content of 5% to 40% by mass.

6. The pneumatic tire according to claim 4,
   wherein the hydrogenated modified styrene-butadiene copolymer is modified by a compound (B2-1) represented by the following Formula (1):

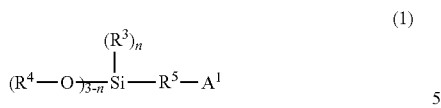

(1)

wherein
A¹ represents a monovalent functional group which contains no active hydrogen, but contains at least one selected from the group consisting of a nitrogen atom, a phosphorus atom, and a sulfur atom, and is bound to $R^5$ through a nitrogen atom, a phosphorus atom, or a sulfur atom;
$R^3$ and $R^4$ each represent a hydrocarbyl group;
$R^5$ represents a hydrocarbylene group; and
n represents an integer of 0 to 2, provided that when two or more $R^3$ or $R^4$ groups are present, they may be the same or different.

7. The pneumatic tire according to claim 1, wherein the hydrogenated styrene-butadiene copolymer has a styrene content of 30% to 40% by mass.

8. The pneumatic tire according to claim 1, wherein the rubber composition further comprises carbon black, and the carbon black is present in amounts of 1 part by mass or more relative to 100 parts by mass of the rubber component.

9. The pneumatic tire according to claim 8, wherein a nitrogen adsorption specific surface area of the carbon black is 5 $m^2$/g to 200 $m^2$/g.

10. The pneumatic tire according to claim 9, wherein the nitrogen adsorption specific surface area of the carbon black is 50 $m^2$/g to 120 $m^2$/g.

\* \* \* \* \*